United States Patent [19]

Sheiman

[11] Patent Number: 4,974,212

[45] Date of Patent: Nov. 27, 1990

[54] METHOD FOR PROCESSING MARINE SEISMIC DATA

[75] Inventor: Jonathan L. Sheiman, Houston, Tex.

[73] Assignee: Shell Oil Company, Houston, Tex.

[21] Appl. No.: 532,133

[22] Filed: May 31, 1990

Related U.S. Application Data

[63] Continuation of Ser. No. 265,159, Oct. 31, 1988, abandoned.

[51] Int. Cl.$^5$ .............................................. G01V 1/38
[52] U.S. Cl. ..................................................... 367/21
[58] Field of Search .................... 181/110; 367/15, 16, 367/17, 18, 19, 20, 21, 53

[56] References Cited

U.S. PATENT DOCUMENTS 3,921,124  11/1975  Payton ................................... 367/17
4,742,497  5/1988  Beasley et al. ......................... 367/52

OTHER PUBLICATIONS

"Dip Moreout by Fourier Transformation," Dissertation submitted to Dept. of Geophysics, Stanford U., by Hale, I. D., 1983.

Primary Examiner—Ian J. Lobo

[57] ABSTRACT

Methods are provided for processing seismic data acquired during marine seismic operations when the seismic streamer cables or sources deviate from their desired acquisition track. The method of the present invention initially processes the data using conventional normal moveout techniques, then applies conventional dip moveout techniques, followed by regularization of the cross-line data, and then 3-D migrating the regularized data. Regularization involves determining the signals at preselected cross-line positions based upon the signals detected and recorded at the measured cross-line CMP positions.

5 Claims, 3 Drawing Sheets

METHOD FOR PROCESSING MARINE SEISMIC DATA

This is a continuation of application Ser. No. 265,159, filed Oct. 31, 1988 now abandoned.

BACKGROUND OF THE INVENTION

This invention relates to marine seismic exploration, and more particularly, relates to acquisition and processing of marine seismic data.

In marine seismic exploration, various impulsive energy sources, which are typically airguns, may be suspended at some preselected depth beneath a float, or some other type of support apparatus. The float or apparatus is in turn towed by an exploration vessel; there may be a plurality of such floats or apparatus towed behind the exploration vessel. The same exploration vessel may also tow a streamer cable, or another exploration vessel may tow the streamer cable, or either exploration vessel may tow more than one streamer cable. The streamer cable contains detectors to detect seismic energy including energy propagating upwardly from subsurface strata lying beneath the body of water in which the vessel operates.

The exploration vessel may determine its location in the body of water through the use of conventional navigational systems. Other onboard equipment is employed to determine the location of the floats or apparatus, or streamer cable(s) and sources relative to the towing vessel; the floats and/or streamer cable(s), may be in many different positions and at various distances depending upon the source and/or detector arrays employed.

In the actual operation of marine seismic vessels towing a marine streamer cable or a plurality of marine streamer cables, it has been found that the streamer cables do not always tow along the path followed by the towing vessel, i.e. along the "track" of the towing vessel. In fact, it has been found that the marine streamer cable usually "feathers" to the side of the track of the towing vessel, such that the marine seismic cable at its end farthest from the towing vessel is displaced significantly from the the towing vessel's desired track. This feathering effect is commonly caused by ocean currents during the seismic operations employing the towing vessel or vessels. Furthermore, the vessels and sources need not follow the precise track desired for subsequent processing.

Recently developed seismic acquisition techniques for so called 3-D shooting, or for improving signal to noise ratios from subsurface layers, employ a plurality of seismic sources spaced from each other. These plurality of seismic sources may be deployed in either wide and/or long arrays. These wide or long source arrays require a plurality of floats or apparatus appropriately disposed in the water and towed by an exploration vessel, or plurality of vessels.

Further, such seismic acquisition techniques may also call for employing a plurality of seismic cables. This plurality of cables may be towed behind the exploration vessel that is towing the source arrays or may be towed behind separate exploration vessel(s) in the vicinity of the exploration vessel towing the sources arrays. The exploration vessels must determine the location of these plurality of sources and streamer cables, in order to accurately process any resulting detected signals.

"Feather" of the marine seismic cable or cables, or deviations of the source arrays from their ideal tracks results in data being acquired off the desired acquisition track(s). This increases the difficulty in conventional processing of the seismic data, since the common midpoint (CMP) locations of the acquired data now lie slightly off the desired acquisition track, rather than lying along the desired acquisition track. Thus, the "feather" of a marine seismic cable causes the CMP locations for the acquired data to be scattered both in-line and cross-line. Previous attempts to process the data acquired with feathered seismic cables have not been totally satisfactory.

In particular, binning techniques have been found not to be totally satisfactory. These binning techniques use a two-dimensional grid to divide the subsurface into bins. However, binning moves all the CMP locations of the data that fall within a particular bin to the center of that bin; the bigger the bin then the more CMP smear that is collapsed to a point, i.e. the center of the bin.

These and other limitations and disadvantages are overcome by the present invention, however, and methods are provided for processing seismic data gathered when marine streamer cables or sources deviate from the towing vessel track, or a desired acquisition track.

SUMMARY OF THE INVENTION

In a preferred embodiment of the present invention, methods are provided for processing seismic data acquired during marine seismic operations when the seismic streamer cables or sources deviate from their desired acquisition track. The method of the present invention initially processes the data using conventional normal moveout techniques, then applies conventional dip moveout techniques, followed by regularization of the cross-line data, and then 3-D migrating the regularized data.

The dip moveout techniques employed by the method of the present invention preferably employs fixed offset so that it follows a line that approximately parallels a track although the line may vary slowly due to current effects on the cable, sources or towing vessels.

Regularization involves determining the signals at preselected cross-line positions based upon the signals detected and recorded at the measured cross-line CMP positions; these measured cross-line positions are determined from the actual position(s) of the streamer cable(s) and source(s) during data acquisition. The preselected cross-line positions may be regularly spaced positions, as opposed to the aforementioned scattered cross-line CMP locations. Preferably, the regularization of the data can neglect any in-line positioning error due to feathering (for feathering angles less than about 10°), and uses the actual cross-line CMP positions determined from the actual measured source and cable positions to allow for a determination of signals for each preselected cross-line position at specified time slices from the measured signal at the actual cross-line CMP positions. This is accomplished by fitting a smooth curve to the signals measured at the actual cross-line CMP positions for each of the time slices. The amplitudes at the preselected cross-line positions are then determined from this smooth curve; the preselected cross-line positions are preferably equally spaced at a spacing dependent upon the spacing between the various vessel tracks or dependent upon the desired spacing of input data points for migration. The regularization of the data provides for well-organized and well-spaced data which minimizes any problems associated with later migration of the data.

It is an object of the present invention to provide a method for processing marine seismic data acquired from marine seismic sources and cables that deviate from a desired track in a manner that employs all the information contained in the seismic signals.

These and other objects and advantages of the present invention will become apparent from the following detailed description, wherein reference is made to the figures in the accompanying drawings.

DETAILED DESCRIPTION

Figure 1:
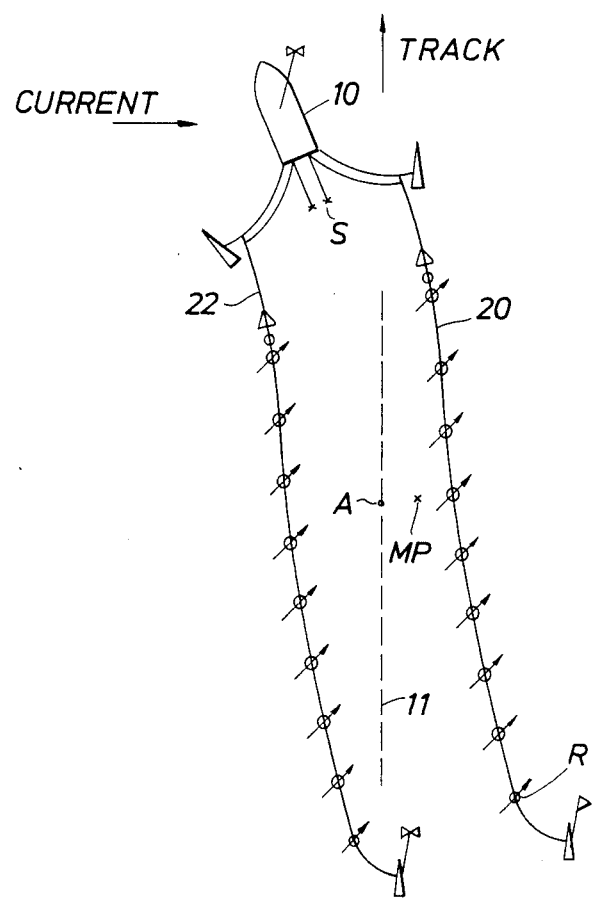
FIG. 1 depicts a plan view of a vessel towing streamer cables with feather.

Referring now to FIG. 1, there may be seen a plan view of a vessel 10 towing streamer cables 20 and 22 behind it. It should be noted that the streamer cables (20 and 22) or source S do not always follow exactly behind the desired acquisition track 11 (or the track of the vessel 10) and in fact tends to move away from this track 11 the farther one moves down the streamer cable 20 away from the towing vessel 10. This movement of the streamer cable 20 away from the track 11 which increases with distance from the towing vessel 10 is usually called "feather", and is used herein for that meaning. Streamer cable feather is usually caused by various water currents during marine seismic operations. It has generally been found that the feather angle measured from a source to any point on the streamer cable is generally less than aout 10°.

The fact that this angle is less than about 10° results in the in-line component of the common midpoint (CMP) positions for the acquired data not moving from their measured positions in a significant manner. However, the CMP position for the acquired data does change significantly from the desired track due to feathering. This results in CMP positions that are approximately correctly positioned in-line with a resulting cross-line smear. The term "smear" is used herein to mean the locational error caused by a streamer cable not following the desired track or due to other causes. This can be seen from FIG. 1 by considering the indicated midpoint (MP) between a source (S) at one end of the cable 20 and receiver (R) at the other end of the cable 20. Other receivers (not shown) are spaced down the length of cable 20. In particular, the midpoint (MP) location can be seen to be well to the side of the track 11, while only slightly displaced from its in-line position if the cable were not feathered and the source was on its desired track; if the cable were not feathered or the source of its track the midpoint (MP) would be located at point A. For receivers closer than the extreme end of the cable 20, the cross-line smear reduces.

Figure 2:
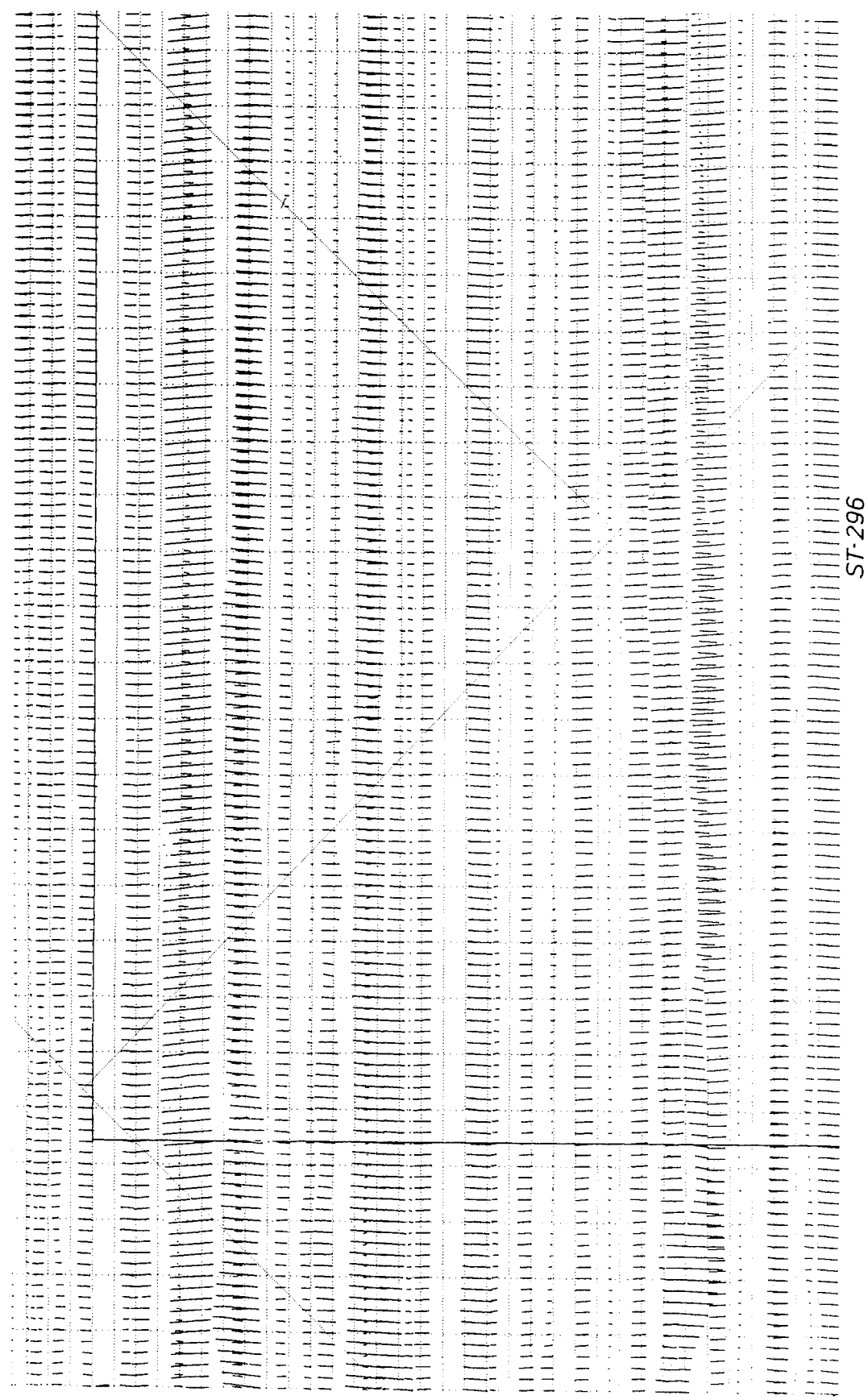
FIG. 2 depicts a map of midpoints for some field data acquired with a feathered cable.

For normal marine seismic acquisition techniques CMP spacing is on the order of approximately fifty feet. Also for conventional marine seismic acquisition techniques, whether 2-D or 3-D, the spacing between the various tracks is approximately 200 feet. However, the feathering of the cables and deviations of the source from the desired track alter this spacing to some generally variable and unpredictable, but determinable value. FIG. 2 illustrates the actual CMP smear during a portion of a marine seismic acquisition program. The length of each of the small lines represent the amount of CMP smear at a particular data acquisition point.

The method of the present invention takes the data acquired with feathered cables and initially performs normal moveout, as is well known in the art. Normal moveout is used to compensate for the fact that the data includes varying travel paths, as evidenced by the various offsets, for a particular CMP location for flat reflectors. That is, normal moveout effectively removes the offset effect for flat reflectors but not for dipping reflectors. Normal moveout prepares the seismic data for the application of the next step of dip moveout; dip moveout removes offset effect for non-horizontal reflectors, as is well known in the art.

After the data has been normal moveout corrected, the data is then dip moveout corrected. Preferably dip moveout correction is normally carried out for each fixed offset separately for each acquisition line. A fixed offset traces a line that is in essence a straight line parallel to the track, or more precisely, a nearly straight line with slowly varying undulations thereon caused by the feather angle and cross-line source position changing slowly as the cable is moved through the water.

Next, the data is regularized. For small feather angles (less than about 10°), the regularization process affects only the cross-line smear of the CMPs, i.e. it removes the cross-line smear. Although the regularization process may involve removal of both cross-line and in-line smear for any feather angle, for the following discussion the feather angle is assumed to be small (i.e, less than about 10°) so that the in-line smear is small and may be safely ignored. In particular, the actual CMP cross-line positions that exist at a particular in-line position are determined for all the tracks in a multi-line survey.

Figure 3A:
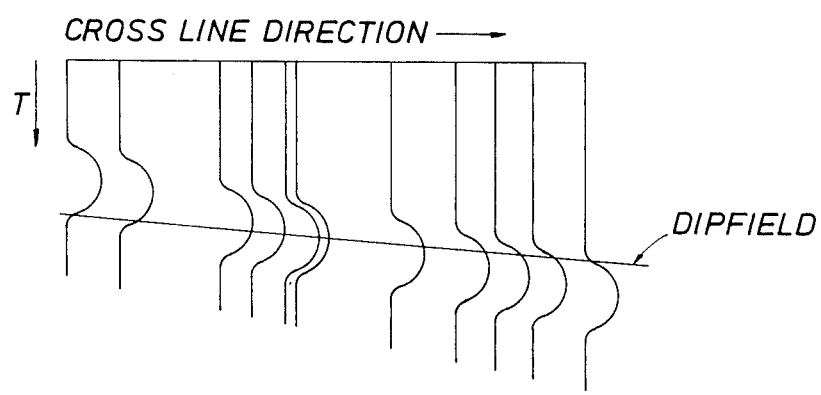
FIGS. 3A and B depict the acquired cross-line data and signal amplitudes for a fixed time slice.
Figure 3B:
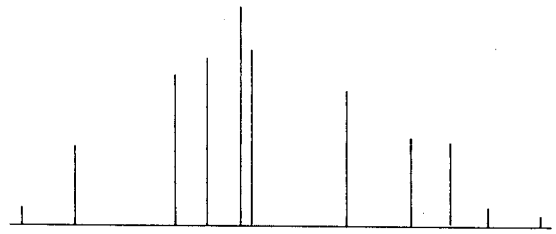

Once these actual positions have been determined, a time slice is selected and the amplitudes of the signals at this time slice and at these various actual cross-line positions (and in-line positions, if desired) are then determined. For example, see FIG. 3A which depicts the actual cross-line positions and waveforms for these positions. FIG. 3B depicts the signal amplitudes at these same positions for a fixed time slice; the fixed time slice corresponds to a preselected, approxImate dip field. Preferably, this time slice is selected to approximately follow the regional dip. An advantage of the present invention is that it is more tolerant of small deviations between the dip field employed and the true dip field.

Figure 4A:
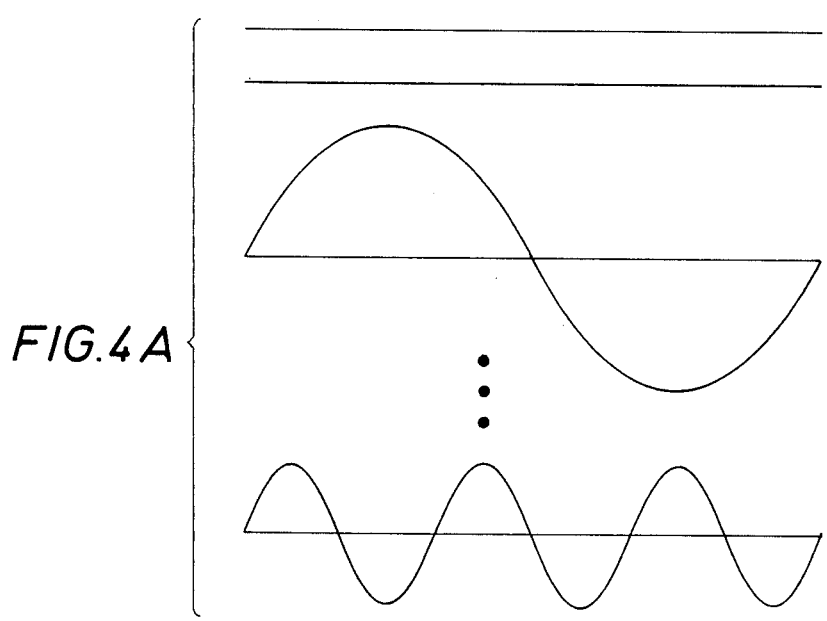
FIGS. 4A and B depict the fitting of a smooth curve to the cross-line data of FIG. 3B.
Figure 4B:
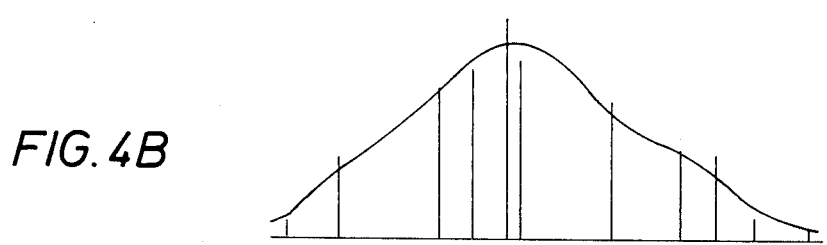
Figure 5A:
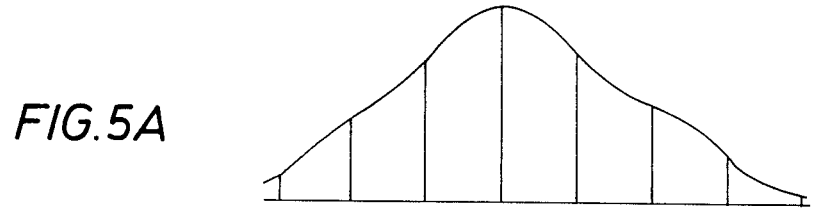
FIGS. 5A and B depict the regularization of data.
Figure 5B:
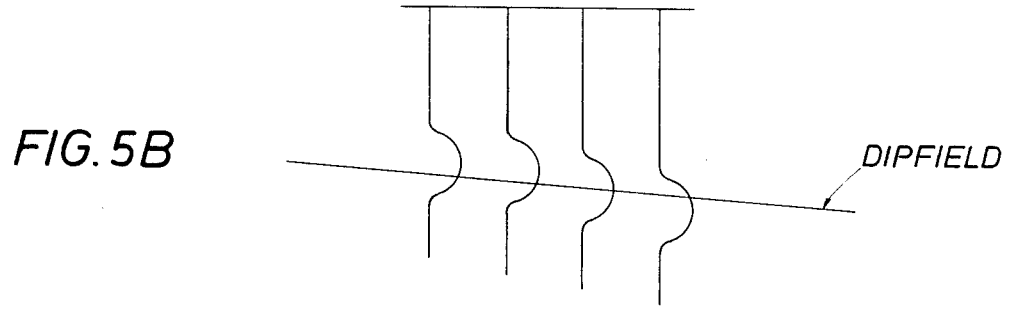

A smooth curve is then fit to the amplitudes of the various cross-line signals corresponding to their physical locations. FIG. 4B illustrates such a curve fit to the data of FIG. 3B. FIG. 4A depicts the make-up of the curve from various sinusoidal curves. In a preferred embodiment, sinusoidal curves with uniformly spaced wave numbers are used to generate the desired smooth curve. The amplitudes of these sinusoidal components are determined by the use of least square techniques, as is well known in the art; more particularly, the amplitudes of the curves are determined from the equations resulting from a least squared fit to each data point. Such sinusoidal curves may vary from D.C. to some preselected maximum wave number in preselected wave number increments. Once the curve has been fit to the actual amplitudes at the actual measured physical locations, the curve may then be used to determine amplitudes at preselected physical locations spaced in the cross-line direction. In FIG. 5A, new positions depicted there are the preselected positions. In particular, regularization determines the amplitudes at equally spaced cross-line positions, that have been selected based upon the CMP track spacing or upon the desired spacing of input data points for migration. FIG. 4B depicts the actual cross-line positions before regularization and FIG. 5A depicts the evenly spaced preselected cross-line positions after regularization. The regularization is carried out for all desired time slices and may be performed for all offsets, or individual offsets, or suItes of offsets in order to allow for residual velocity errors to be corrected before stacking of the offsets is performed.

Once the da(a has been regularized it is then migrated in the conventional sense, as is well known in the prior art. See for example, the article by Gibson et al; "Efficient 3-D Migration In Two Steps", Geophysical Prospecting, Vol. 31, pp. 1-33, Gibson, B, Larner, K. and Levin, S.

Many other variations and modifications may be made in the techniques hereinbefore described, by those having experience in this technology, without departing from the concepts of the present invention. Accordingly, it should be clearly understood that the methods depicted in the accompanying drawings and referred to in the foregoing description are illustrative only and are not intended as limitations on the scope of the invention.

What is claimed is:

1. A method for processing 3-D marine seismic data, comprising:
   normal moveout correcting the data,
   dip moveout correcting the data,
   regularizing the data, and
   3-D migrating the regularized data.

2. A method for processing 3-D marine seismic data having measured positions and signals, comprising:
   normal moveout correcting the data,
   dip moveout correcting the data,
   regularizing the data by:
   determining measured positions and signals for said data,
   determining signals along a preselected time slice,
   fitting a smooth curve to the signals at said determined positions, and
   determining the values of the smooth curve at preselected positions, and then
   3-D migrating the regularized data.

3. A method as described in claim 2, wherein said smooth curve is generated from preselected sinusoidal curves.

4. A method of regularizing 2-D seismic data comprising:
   selecting seismic data along a time slice,
   fitting a smooth curve to the amplitude portion of the selected seismic data at measured positions, and
   selecting the amplitude values of the smooth curve corresponding to preselected locations.

5. A method as described in claim 4, wherein said smooth curve is generated by sinusoidal curves uniformly spaced in wave number.

* * * * *